United States Patent
Attia et al.

(10) Patent No.: US 7,245,780 B2
(45) Date of Patent: *Jul. 17, 2007

(54) GROUP AVERAGE FILTER ALGORITHM FOR DIGITAL IMAGE PROCESSING

(75) Inventors: Olivier Attia, New York, NY (US); Prateek Shrivastava, Newark, NJ (US); Roman Zastepine, Brooklyn, NY (US); Avi Outmezguine, Brooklyn, NY (US)

(73) Assignee: Scanbuy, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/410,565

(22) Filed: Apr. 24, 2006

(65) Prior Publication Data

US 2006/0193530 A1     Aug. 31, 2006

Related U.S. Application Data

(63) Continuation of application No. 10/832,319, filed on Apr. 27, 2004.

(60) Provisional application No. 60/493,792, filed on Aug. 11, 2003.

(51) Int. Cl.
*G06K 9/38* (2006.01)

(52) U.S. Cl. ............... 382/272; 382/176; 382/172; 382/266; 235/462.01

(58) Field of Classification Search ............... 382/272
See application file for complete search history.

(56) References Cited

U.S. PATENT DOCUMENTS

| 4,238,768 | A | * | 12/1980 | Mitsuya et al. | 375/240.24 |
| 4,323,973 | A | * | 4/1982 | Greenfield | 382/130 |
| 4,554,593 | A | * | 11/1985 | Fox et al. | 358/3.24 |

(Continued)

FOREIGN PATENT DOCUMENTS

| WO | WO 2005/020140 | 3/2005 |
| WO | WO 2005/062234 | 7/2005 |

OTHER PUBLICATIONS

Trier, O.D., Jain, A.K., "Goal-Directed Evaluation of Binarization Methods", Pattern Analysis and Machine Intelligence, IEEE Transactions on, Dec. 1995, ISSN: 0162-8828.*

(Continued)

*Primary Examiner*—Matthew C. Bella
*Assistant Examiner*—Sath V. Perungavoor
(74) *Attorney, Agent, or Firm*—Wilmer Cutler Pickering Hale and Dorr LLP

(57) ABSTRACT

This present invention discloses a system and method for enhancing images of barcodes and other similar objects taken by the digital camera connected to or embedded in a mobile device. This filter works by converting the image into its equivalent gray scale. The algorithm then computes the mean pixel intensity value of a row of pixels in the image. The row is divided into sections and the mean pixel intensity of each section is also calculated. The pixels in each section are processed according to the relation of the relative mean intensities of the row and the section. Once each pixel has been processed, the image is reassembled from its divided sections.

21 Claims, 3 Drawing Sheets

U.S. PATENT DOCUMENTS

| | | | |
|---|---|---|---|
| 4,774,569 A * | 9/1988 | Morton et al. | 348/107 |
| 4,969,202 A | 11/1990 | Groezinger | |
| 5,016,118 A * | 5/1991 | Nannichi | 358/462 |
| 5,113,454 A * | 5/1992 | Marcantonio et al. | 382/108 |
| 5,179,599 A * | 1/1993 | Formanek | 382/172 |
| 5,243,443 A * | 9/1993 | Eschbach | 358/3.03 |
| 5,243,444 A * | 9/1993 | Fan | 358/3.08 |
| 5,276,315 A * | 1/1994 | Surka | 235/462.1 |
| 5,327,240 A * | 7/1994 | Golston et al. | 348/607 |
| 5,331,442 A * | 7/1994 | Sorimachi | 358/532 |
| 5,345,317 A * | 9/1994 | Katsuno et al. | 382/239 |
| 5,510,604 A * | 4/1996 | England | 235/462.25 |
| 5,767,978 A * | 6/1998 | Revankar et al. | 358/296 |
| 5,778,092 A | 7/1998 | MacLeod et al. | |
| 5,852,677 A | 12/1998 | Nakamura et al. | |
| 5,877,486 A * | 3/1999 | Maltsev et al. | 235/462.15 |
| 5,890,021 A * | 3/1999 | Onoda | 396/121 |
| 5,909,505 A * | 6/1999 | Katayama et al. | 382/164 |
| 5,915,039 A * | 6/1999 | Lorie et al. | 382/230 |
| 5,963,669 A * | 10/1999 | Wesolkowski et al. | 382/206 |
| 5,969,325 A * | 10/1999 | Hecht et al. | 235/462.16 |
| 6,045,515 A * | 4/2000 | Lawton | 600/558 |
| 6,091,511 A | 7/2000 | Ben Dror et al. | |
| 6,101,285 A * | 8/2000 | Fan | 382/260 |
| 6,115,488 A * | 9/2000 | Rogers et al. | 382/132 |
| 6,137,898 A * | 10/2000 | Broussard et al. | 382/132 |
| 6,201,612 B1 * | 3/2001 | Matsushiro et al. | 358/1.9 |
| 6,282,307 B1 * | 8/2001 | Armato et al. | 382/132 |
| 6,347,156 B1 * | 2/2002 | Kamada et al. | 382/237 |
| 6,366,696 B1 | 4/2002 | Hertz et al. | |
| 6,650,766 B1 * | 11/2003 | Rogers et al. | 382/132 |
| 6,735,341 B1 * | 5/2004 | Horie et al. | 382/239 |
| 6,735,745 B2 | 5/2004 | Sarig et al. | |
| 6,898,329 B1 * | 5/2005 | Takahashi | 382/272 |
| 2002/0090107 A1 * | 7/2002 | Acharya et al. | 382/100 |
| 2003/0007696 A1 * | 1/2003 | Saito | 382/239 |
| 2003/0123710 A1 * | 7/2003 | Nakazawa et al. | 382/115 |
| 2004/0042670 A1 * | 3/2004 | Moroo et al. | 382/232 |
| 2004/0101183 A1 * | 5/2004 | Mullick et al. | 382/131 |
| 2004/0240737 A1 * | 12/2004 | Lim et al. | 382/182 |
| 2005/0035206 A1 | 2/2005 | Attia et al. | |
| 2005/0121521 A1 | 6/2005 | Ghai et al. | |

OTHER PUBLICATIONS

J. M. White and G. D. Rohorer, "Image thresholding for optical character recognition and other applications requiring character image extraction," IBM J. Res. Develop., vol. 27, No. 4, pp. 400-411, 1983.*

J.M. White and G.D. Rohner, "Image Thresholding for Optical Character Recognition and Other Applications Requiring Character Image Extraction," IBM J. Res. Develop.., vol. 27, No. 4, Jul. 1983, pp. 400-411.

* cited by examiner

GROUP AVERAGE FILTER ALGORITHM FOR DIGITAL IMAGE PROCESSING

CROSS-REFERENCE TO RELATED APPLICATIONS

This application is a continuation of U.S. patent application Ser. No. 10/832,319, filed Apr. 27, 2004, which claims the benefit of U.S. provisional patent application No. 60/493,792, filed Aug. 11, 2003. Both of these prior applications are hereby incorporated by reference herein in their entireties.

FIELD OF THE INVENTION

The present invention relates generally to the field of image enhancement algorithms. More specifically, the present invention utilizes an algorithm designed to sharpen images of barcodes to aid in decoding.

BACKGROUND OF THE INVENTION

Barcodes have been utilized for identifying and pricing objects for more than thirty years. Most typically, barcodes are used in retail to identify the item of merchandise. For example, a gallon of milk may contain a barcode that, when scanned, will notify the cashier of the price of the milk.

Yet in recent years, barcodes have acquired new purposes as computers and barcode scanners have become more portable. The circuitry required to scan a conventional one-dimensional barcode can now be housed in a device as small as a typical keychain. As a result, many mobile telephones, personal digital assistants ("PDAs"), and pagers can be retrofitted with or connected to a laser-based scanning device. This allows the mobile device to function as a scanner capable of storing hundreds or thousands of scanned barcodes.

Currently, many cell phones and mobile devices are available with built-in cameras. The explosion of the availability of affordable digital cameras and their inclusion into mobile devices is driven by several factors. One of the most important is the recent availability of inexpensive image sensors based on CMOS technology. The cameras on these devices provide a means for capturing the barcode information which was previously only accessible via a laser-based scanner. Decoding barcode images from digital cameras included in mobile devices presents several difficult problems. These problems go well beyond the challenges addressed in commercial barcode readers. Some of these problems are addressed below:

Lighting:

Most mobile devices with integrated digital cameras do not have built-in flashes and rely solely on the ambient light for illumination. This can cause the image to be underexposed or overexposed depending upon the intensity of the ambient light. Bad lighting may also cause the image to appear shadowy.

Focus:

Digital cameras for portable devices are usually designed to work at a variety of distances. The need for a wider range of focus in cameras results in a trade off between the cost of the lens component and the sharpness of a typical image.

Low-cost lens components:

In order to meet cost constraints of many portable device markets, manufacturers often compromise on the optical quality of camera lenses. This can present decoding technology with a different set of challenges from the simple focal length based focus problem noted above. Low-cost lens components can produce image distortions that are localized to a specific region or form a changing gradient across the image.

Limited resolution:

The cost of a digital imaging CMOS sensor increases as the number of image pixels increases. Although the Asian market has seen the release of general purpose consumer devices like PDAs and cell phones with "megapixel" image resolution, the European and North American markets are now only seeing their emergence. Lower resolution images contain less detail and usually require further processing to be useful.

Based on the aforementioned described problems with mobile digital imaging, there clearly exists a need for an image enhancement algorithm which can compensate for the poor images which result from these shortcomings. Such an algorithm would allow a greater number of images acquired via digital imaging techniques to be decoded.

SUMMARY OF THE INVENTION

The present invention provides an algorithm designed to apply an image-processing filter which mainly suppresses the high frequencies in the image and filters the low frequencies, thus smoothing the image and enhancing the detection of edges. First, the sharpening algorithm converts the gray-scale barcode image is broken down into a two-dimensional array. Each entry in the two-dimensional array stores the intensity of a single pixel.

The image is then converted to a grayscale image. Typically, this is done by mapping each color pixel to its equivalent in grayscale. Next, a row of pixels from the image is selected for processing. The mean intensity of the row is computed by averaging all of the pixel intensities from the row.

The row of pixels is then divided into three to ten equal sections. The number of sections can either be selected by the user or predetermined by the image processing algorithm. The mean pixel intensity of each section is also computed by averaging the pixel intensities in each section. If the mean intensity value for a section is greater than the mean intensity value for the entire row, the pixel intensities are recalculated for that section utilizing a proprietary formula. Generally, if a pixel's intensity is slightly greater than the average pixel intensity for that section, the pixel is assigned an intensity value identifying it as "white." If a pixel's intensity is slightly less than the average pixel intensity for that section, it is assigned an intensity value identifying it as "black." Pixels having an intensity value close to the mean value are typically not changed.

If the mean intensity value for a section is less than the mean intensity value for the entire row, the pixel intensities are recalculated for that section utilizing a similar proprietary formula. Generally, if a pixel's intensity is slightly greater than the average pixel intensity for that section, the pixel is assigned an intensity value identifying it as "white." If a pixel's intensity is slightly less than the average pixel intensity for that section, it is assigned an intensity value identifying it as "black." Pixels having an intensity value close to the mean value are typically not changed in this instance either.

Once each pixel in the row has been processed utilizing the above described process, the enhanced image is reconstructed by rejoining the sections of the row. The row is then available for decoding.

Therefore, it is an object of the present invention to provide a group average filter capable of sharpening a row of pixels to aid in optical decoding.

An additional object of the present invention is to provide an image enhancement algorithm which divides a row of pixels from an image into sections prior to processing.

Another object of the present invention is to provide an image enhancement algorithm which utilizes the mean intensity for the row of pixels in processing each section of the row.

It is also an object of the present invention to provide an image enhancement algorithm which converts the image to grayscale prior to processing.

These and other objects of the present will be made clearer with reference to the following detailed description and accompanying drawings.

DETAILED DESCRIPTION OF THE PREFERRED EMBODIMENT(S)

The following presents a detailed description of a preferred embodiment (as well as some alternative embodiments) of the present invention. However, it should be apparent to one skilled in the art that the described embodiment may be modified in form and content to be optimized for a wide variety of situations.

Figure 1:
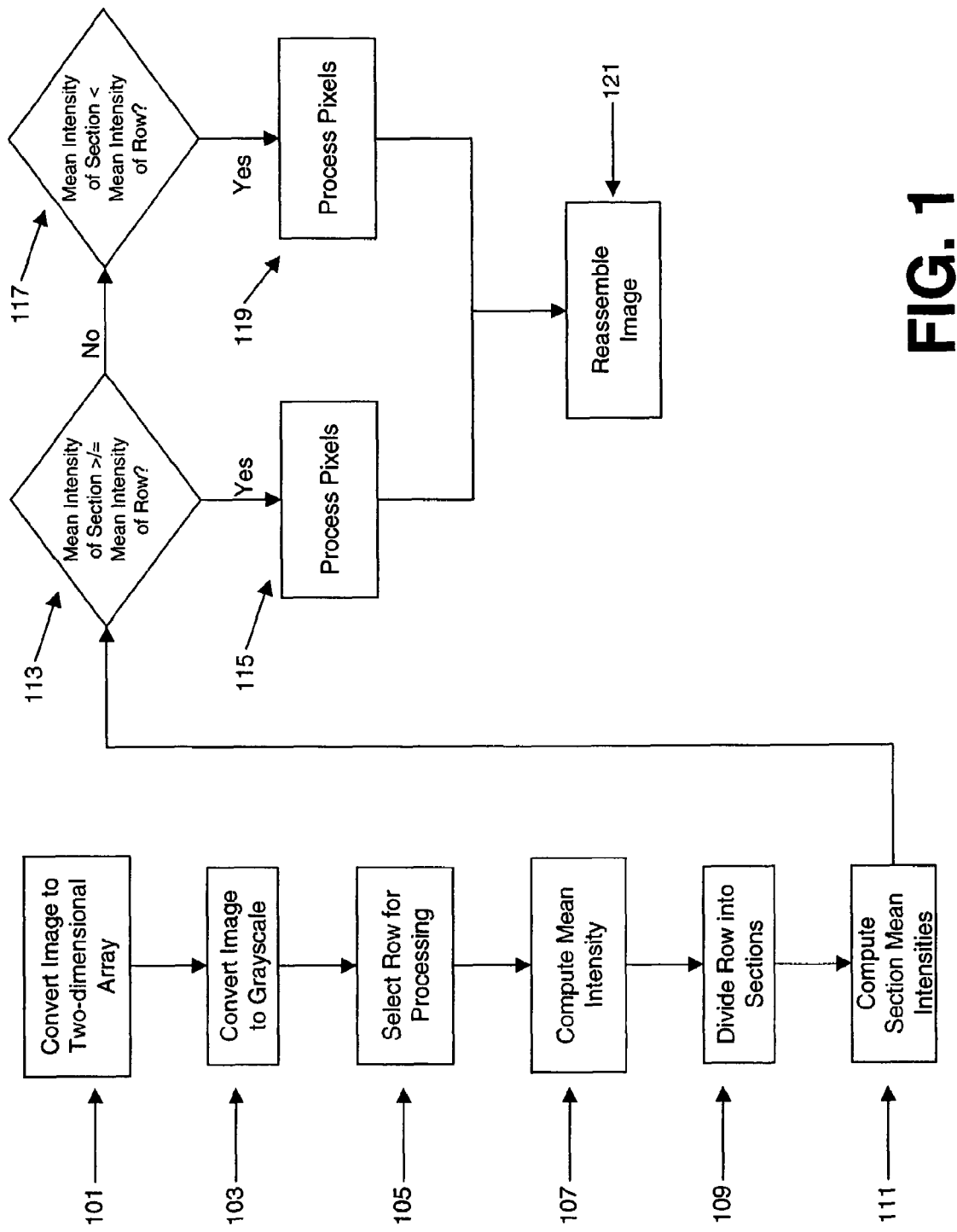
FIG. 1 depicts a flowchart showing the process utilized to sharpen an image.

With reference first to FIG. 1, shown is a flowchart depicting the steps of the image enhancement algorithm of the present invention. The image enhancement algorithm has been shown to be particularly effective for sharpening rows of pixels from a barcode image. First, the sharpening algorithm converts the barcode image into a two-dimensional array in step 101. Each entry in the two-dimensional array stores the intensity value of a single pixel. The image can now be described as a function as follows:

$$\text{Image} = \sum_{x=0}^{n-1} \sum_{y=0}^{m-1} f(x, y)$$

where n is the image width and m is the image height. The image is then converted to a grayscale image in step 103 by mapping each pixel to its grayscale representative. In the preferred embodiment, this is done utilizing a standard color to grayscale filter.

Next, a row of pixels from the image is selected for processing in step 105. The mean intensity of the row is then computed by averaging all of the pixel intensities from the row in step 107. The mean can be represented as follows:

$$\text{mean(row)} = \left( \sum_{x=0}^{n-1} pixelColor(x, y) \right) / n$$

Where n is the number of pixels in the row and y is the horizontal pixel value of the selected row.

The row of pixels is then divided into three to ten equal sections in step 109. The number of sections can either be selected by the user or predetermined by the image processing algorithm. The mean pixel intensity of each section is then computed by averaging the intensities of the pixels in each section in step 111.

If the mean pixel intensity of the section is greater than or equal to the mean pixel intensity of the row as determined in step 113, the intensity of each pixel is recalculated in step 115 according to the following formula:

if pixelColor(x,y)+P*(pixelColor(x,y))>mean pixel intensity of section, then
New Pixel value g(x,y)="white," else
New Pixel value g(x,y)="black"
where, $1 \leq P \leq 20$ The value of P can either be user defined or selected by the algorithm. The function "pixelcolor(x,y)" refers to the pixel intensity stored in that particular entry in the two dimensional array which defines the image. The pixel intensity values assigned to "white" and "black" depend upon the image format being used. For example, in a 256 color grayscale image, pixel intensities of zero would be assigned to "white" and 256 would be assigned to "black." Pixels having an intensity value close to the mean value are typically not changed in this instance either.

If the mean pixel intensity of the section is less than the mean pixel intensity of the row as determined in step 117, the intensity of each pixel in the section is recalculated in step 119 according to the following formula:

if, pixelColor(x,y)−P*(pixelColor(x,y))>mean pixel intensity of section, then
New Pixel value g(x,y)="white," else
New Pixel value g(x, y)="black"
where, $1 \leq P \leq 20$ The value of P can either be user defined or selected by the algorithm. The function "pixelcolor(x,y)" refers to the pixel intensity stored in that particular entry in the two dimensional array which defines the image. The pixel intensity values assigned to "white" and "black" depend upon the image format being used.

Once each pixel in the row has been processed utilizing the above described process, the enhanced image is reconstructed in step 121 by rejoining the sections of the row. The row is then available for decoding.

Figure 2A:
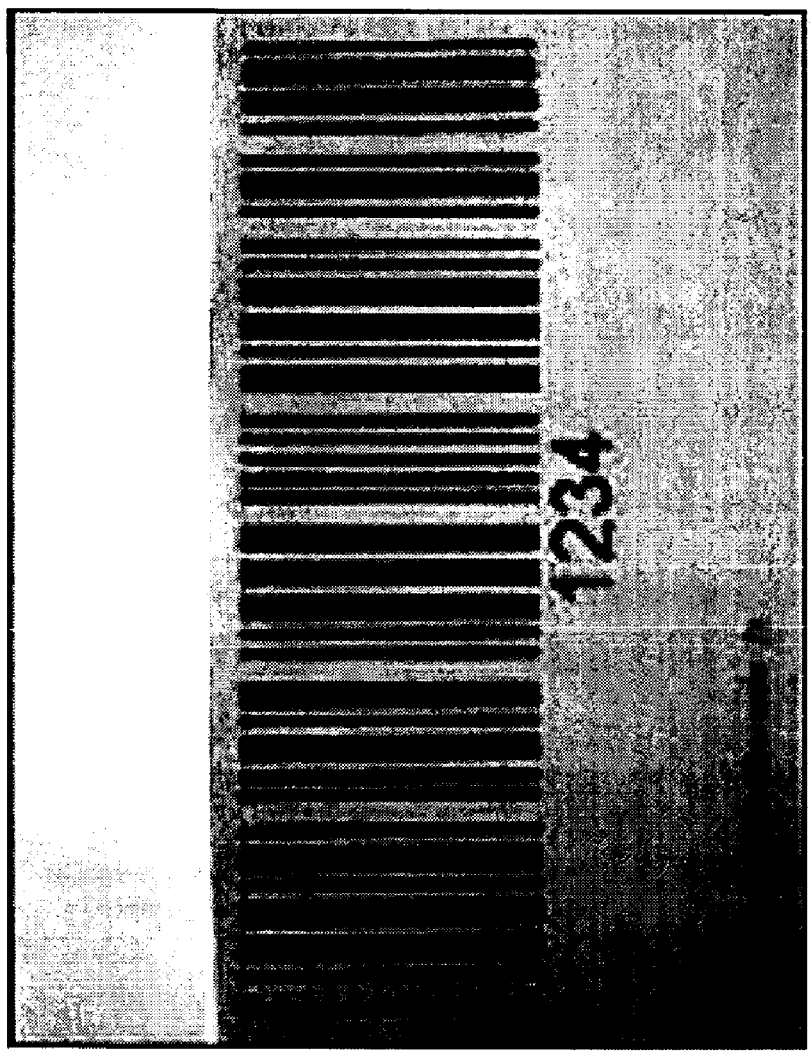
FIG. 2A depicts a typical barcode image acquired using a digital camera.
Figure 2B:
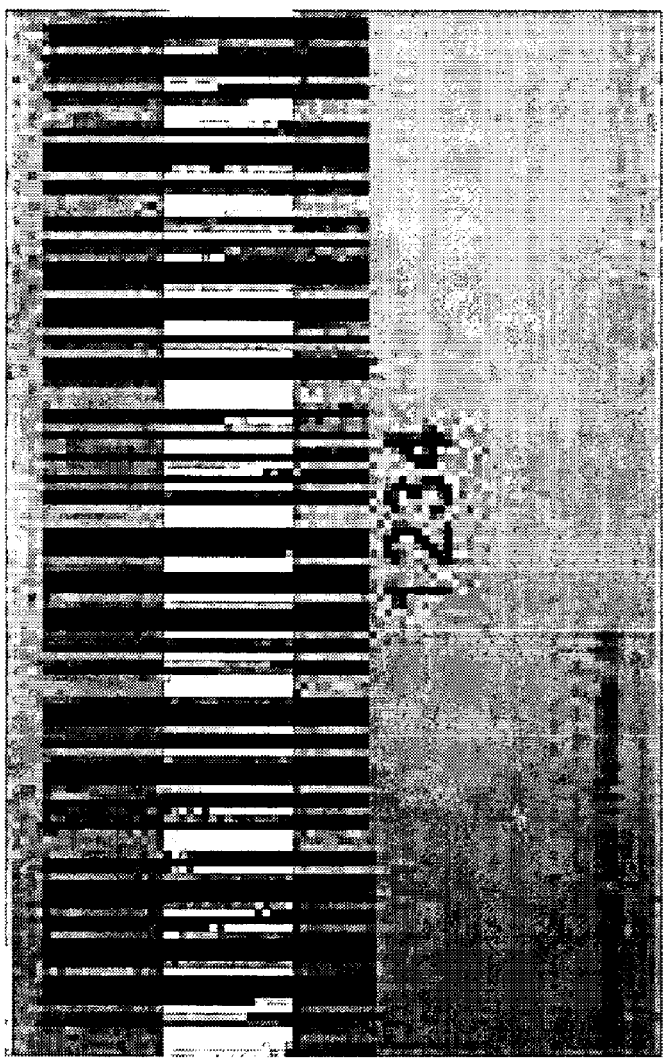
FIG. 2B depicts the barcode of FIG. 2A after it has undergone sharpening utilizing the sharpening filter of the present invention.

An example input and output barcode which have been processed by the aforementioned sharpening algorithm are shown in FIG. 2A and FIG. 2B, respectively. The rows which were processed by the algorithm of the present invention as shown in FIG. 2B have more contrast between the barcode and the background of the image as compared to the inputted image of FIG. 2A.

While the foregoing embodiments of the invention have been set forth in considerable detail for the purposes of making a complete disclosure, it should be evident to one skilled in the art that multiple changes may be made to the aforementioned description without departing from the spirit of the invention.

We claim:

1. A method for processing digital images, comprising:
   converting an image to a two-dimensional array, wherein the two-dimensional array comprises one or more rows of pixels, and wherein each row of pixels comprises one or more row sections;
   computing a mean intensity of a row of pixels;
   computing a mean intensity of a row section of the row of pixels;
   if the mean intensity of the row section is greater than the mean intensity of the row of pixels, processing the pixels in the row section according to a first method;
   if the mean intensity of the row section is less than the mean intensity of the row of pixels, processing the pixels in the row section according to a second method; and
   wherein each of the first method and the second method comprises comparing the mean intensity of the row of pixels to a value computed as a function of a non-zero percentage threshold and an intensity of a pixel in the row section.

2. The method of claim 1, wherein for the first method the computed value is the sum of the intensity of the pixel in the row section and the product of the non-zero percentage threshold and the intensity of the pixel in the row section.

3. The method of claim 2, wherein the first method further comprises:
   assigning the pixel in the row section an intensity corresponding to white if the computed value is greater than the mean intensity of the row; and
   assigning the pixel in the row section an intensity corresponding to black if the computed value is less than the mean intensity of the row.

4. The method of claim 1, wherein for the second method the computed value is the product of the non-zero percentage threshold and the intensity of the pixel in the row section subtracted from the intensity of the pixel in the row section.

5. The method of claim 4, wherein the second method further comprises:
   assigning the pixel in the row section an intensity corresponding to white if the computed value is greater than the mean intensity of the row; and
   assigning the pixel in the row section an intensity corresponding to black if the computed value is less than the mean intensity of the row.

6. The method of claim 1, further comprising:
   if the mean intensity of the row section is equal to the mean intensity of the row, disregarding the pixels in the row section.

7. The method of claim 1, further comprising:
   mapping each pixel of the two-dimensional array to a corresponding grayscale equivalent.

8. The method of claim 1, further comprising:
   prior to processing the pixels in the two-dimensional array, mapping each pixel of the two-dimensional array to a corresponding grayscale equivalent.

9. The method of claim 1, further comprising:
   processing the pixels in each row section of the row of pixels; and
   reassembling the row of pixels after the one or more row sections have been processed.

10. The method of claim 1, further comprising:
    processing the pixels in each row of pixels of the two-dimensional array; and
    reassembling the rows of pixels after the one or more rows have been processed.

11. The method of claim 1, wherein the number of row sections is in the range of three row sections to ten row sections.

12. The method of claim 1, wherein the number of row sections is a number received from a user.

13. The method of claim 1, wherein the number of row sections is a predetermined number of row sections.

14. The method of claim 1, wherein the number of row sections is the same for each row of pixels.

15. The method of claim 1, wherein the non-zero percentage threshold is less than or equal to twenty.

16. The method of claim 1, wherein the image is a barcode image.

17. The method of claim 16, further comprising:
    processing the pixels in each row of pixels of the two-dimensional array;
    reassembling the rows of pixels after the one or more rows have been processed; and
    decoding the barcode image.

18. The method of claim 16, further comprising:
    capturing the barcode image using a camera-enabled mobile device.

19. A computer readable medium storing computer executable instructions for processing digital images, the executable instructions comprising:
    converting an image to a two-dimensional array, wherein the two-dimensional array comprises one or more rows of pixels, and wherein each row of pixels comprises one or more row sections;
    computing a mean intensity of a row of pixels;
    computing a mean intensity of a row section of the row of pixels;
    if the mean intensity of the row section is greater than the mean intensity of the row of pixels, processing the pixels in the row section according to a first method;
    if the mean intensity of the row section is less than the mean intensity of the row of pixels, processing the pixels in the row section according to a second method; and
    wherein each of the first method and the second method comprises comparing the mean intensity of the row of pixels to a value computed as a function of a non-zero percentage threshold and an intensity of a pixel in the row section.

20. A device for processing digital images, comprising:
    a processor executing an application that is configured to:
    convert an image to a two-dimensional array, wherein the two-dimensional array comprises one or more rows of pixels, and wherein each row of pixels comprises one or more row sections;
    compute a mean intensity of a row of pixels;
    compute a mean intensity of a row section of the row of pixels;
    if the mean intensity of the row section is greater than the mean intensity of the row of pixels, process the pixels in the row section according to a first method;
    if the mean intensity of the row section is less than the mean intensity of the row of pixels, process the pixels in the row section according to a second method; and
    wherein each of the first method and the second method comprises comparing the mean intensity of the row of pixels to a value computed as a function of a non-zero percentage threshold and an intensity of a pixel in the row section.

21. The device of claim 20, wherein the image is a barcode image, the device further comprising:
    a digital camera that is configured to capture the barcode image.

* * * * *